United States Patent [19]

Bennett

[11] 3,940,080

[45] Feb. 24, 1976

[54] AUTOMATIC TAPE LOADING APPARATUS FOR CASSETTES AND THE LIKE

[75] Inventor: William P. Bennett, Northbrook, Ill.

[73] Assignee: Programming Technologies, Inc., Chicago, Ill.

[22] Filed: May 31, 1974

[21] Appl. No.: 474,894

Related U.S. Application Data

[63] Continuation-in-part of Ser. No. 296,255, Oct. 10, 1972, Pat. No. 3,814,343.

[52] U.S. Cl.............. 242/182; 242/56 R; 242/58.4
[51] Int. Cl.².................. G11B 15/58; B65H 19/20
[58] Field of Search........... 242/182, 183, 186, 184, 242/58.4, 58.5, 67.3 R

[56] References Cited
UNITED STATES PATENTS

| | | | |
|---|---|---|---|
| 3,454,960 | 7/1969 | Lohrenz | 242/184 |
| 3,637,153 | 1/1972 | King | 242/58.4 |
| 3,693,900 | 9/1972 | Bohn | 242/58.4 |
| 3,713,606 | 1/1973 | Van Pelt | 242/186 |
| 3,737,358 | 6/1973 | King | 242/56 R |
| 3,753,834 | 8/1973 | King | 242/58.4 |
| 3,776,487 | 12/1973 | Henderson | 242/182 |

Primary Examiner—Edward J. McCarthy
Attorney, Agent, or Firm—Lawrence S. Lawrence

[57] ABSTRACT

An apparatus is provided for automatically loading a plurality of cassettes of the type having two rotatable spools and a leader tape connecting said spools with a predetermined length of magnetic tape or the like from a supply reel. The apparatus includes a magazine for storing a plurality of empty cassettes, means for advancing said cassettes, one at a time, from the magazine to a loading station, means for withdrawing the leader from the cassette, cutting it into two sections, and splicing the free end of one section to the leading end of a length of supply tape, means for feeding supply tape at a controlled rate, means for automatically rotating one of the spools of said cassette to wind the spliced leader section and a predetermined length of said supply tape into said cassette, and means for cutting the supply tape after said predetermined amount has been wound into the cassette and splicing the trailing end thereof to the free end of the other leader section. Means are also provided to eject the fully loaded cassette from the apparatus and recommence the tape loading cycle with the following cassette stored in the magazine.

16 Claims, 16 Drawing Figures

AUTOMATIC TAPE LOADING APPARATUS FOR CASSETTES AND THE LIKE

This application is a continuation-in-part of copending application Ser. No. 296,255, filed Oct. 10, 1972 now U.S. Pat. No. 3,814,343.

BACKGROUND OF THE INVENTION

In accordance with the co-pending prior application, an apparatus is provided for automatically loading a plurality of tape cassettes with prerecorded or blank magnetic tape or the like from a supply source. Unlike the cassette winding devices of the past, the apparatus of the parent application is fully automatic; the only manual steps required by the operator being to load a plurality of empty cassettes into a magazine or hopper, install a reel of supply tape and splicing tape, thread the supply tape and splicing tape into the machine and activate the start control. Each cassette is then automatically fed from the magazine to a loading station where the leader is automatically extracted, the cassette is loaded with a predetermined amount of the supply tape, and is then automatically ejected from the machine, all without the assistance of an operator. The entire feeding, loading and ejecting operation is fully automatic; as the loading of each cassette with the supply tape is completed, it is ejected from the machine and the next empty cassette is transported into the loading position. The only limitation on the number of cassettes that can be automatically filled with magnetic tape by the instant machine is the size of the supply reel and the capacity of the cassette storage magazine. Accordingly, the operator of the machine must merely monitor the supply of cassettes and the supply of tape and replenish the same as required in order to maintain the machine in operation and minimize its downtime. Due to its fully automatic nature, the machine is capable of operating at a much higher rate of speed than prior winding devices, and thus results in lower cost cassettes. In addition, there is further labor saving inasmuch as a single operator can monitor several machines, whereas in the past a single operator was required for each individual machine in order to implement the many manual operations that were necessary to load each cassette.

In general, the automatic cassette loading apparatus as disclosed in the parent application comprises, in combination, a magazine for storing a supply of empty cassettes to be loaded; cassette receiving means adapted to removably receive one cassette at a time from a magazine and hold the same in a tape loading position; feed means for transporting each cassette from said magazine to said cassette receiving means; a spindle for rotatably supporting a reel of supply tape; a splicing block comprising a first section having a first guide means in its top surface for receiving a length of leader or supply tape, and a second section disposed adjacent the first section having second and third guide means in the top surface thereof, each for receiving a length of leader or supply tape, at least one of said sections being movable between a first position in which the first guide means is in alignment with the second guide means, and a second position in which the first guide is in alignment with the third guide means; means for withdrawing the leader from a cassette in the loading position; means for positioning the leader in the first and second guide means of the splicing block in its first position; means for cutting the tape positioned on the splicing block, movable between a first cutting position in the first position of the splicing block to cut the leader tape into two sections, and a second cutting position in the second position of the splicing block to cut the supply tape after the predetermined amount thereof has been wound into the cassette; splicing means disposed adjacent said splicing block to splice the end of one leader section to the leading end of the supply tape in the second position of the splicing block and to splice the trailing end of the supply tape to the end of the second leader section in the first position of the splicing block; rotatable drive means adapted to removably engage at least one spool of a cassette in the loading position to wind the supply tape into said cassette after the same has been spliced to said leader; sensing means to measure the amount of supply tape being wound into the cassette, and to deactivate the drive means when a predetermined amount of said tape has been so wound; means for ejecting a cassette from the cassette receiving means after it has been fully loaded with supply tape; and control means adapted to sequentially and cyclically activate and deactivate each of the foregoing elements of the apparatus to effectuate the continuous loading of a plurality of cassettes.

The structure of the various components of the automatic winding apparatus described above are fully disclosed in the co-pending parent application and to the extent necessary for a complete understanding of the present invention are further described hereinafter with reference to the annexed drawings.

SUMMARY OF THE INVENTION

In accordance with the present invention, an improved automatic winding apparatus of the type described above is provided with the addition of automatic speed and tensioning control means for advancing the magnetic tape from supply reel to the tape loading position at a controlled rate. Such means compensates for the intertial drag of the supply reel caused by a rapid succession of starts and stops during the cassette loading operation, avoids stretching of the magnetic tape, and permits a constant tape tension, higher winding speeds and rapid acceleration. With the implementation of the control means of the present invention, the automatic tape winding apparatus is capable of achieving winding speeds in excess of 400 inches of tape per second.

In general, the tape speed and tension control means of the present invention for use in an automatic winding apparatus of the type described above comprises, in combination, a drive motor for imparting rotational movement to the spindle supporting the reel of supply tape; a clutch-brake assembly operatively linking the drive motor and the spindle to activate the rotational movement of said spindle and to control the drag thereon; and means connected to the clutch-brake assembly for controlling the speed and tension of the supply tape, which means includes vacuum means for receiving a loop of supply tape and is responsive to the size of said loop to correspondingly control the operation of the clutch-brake assembly to maintain a relatively constant loop size, thus, insuring a relatively constant tape speed and tension during the cassette loading operation.

In addition, in the preferred embodiment the drive motor is of the variable speed constant torque type, and additional variable speed control means operative in conjunction with the speed and tension control means described above is also provided. The variable speed control means is connected to a drive motor control circuit and is responsive to the amount of magnetic tape on the supply reel to increase the rotational speed of the motor and the spindle upon which the supply reel is mounted as the amount of supply tape on the reel diminishes, so as to maintain a relatively constant linear supply tape speed.

The clutch-brake assembly serves two functions, firstly, by means of the clutch portion to disengage the supply tape spindle from the drive motor when it is desired to stop the forward movement of the supply tape during, or at the end of, a winding cycle, and, secondly, to control the speed of the spindle and the reel mounted thereon by means of the brake portion, both such portions being controlled by the vacuum means mentioned hereinabove. The clutch-brake assembly is preferably of the pneumatic type whereby the amount of air pressure fed thereto controls the drag placed upon the supply reel to which it is connected. However, it should be noted that other clutch-brake systems, such as electro-magnetically operated devices can also be adapted for use in the present invention.

As noted above, the drive motor is preferably of the variable speed constant torque type, such as Model No. 3M293 manufactured by Dayton Motor Company, and is connected to the clutch-brake assembly by means of a drive belt or the like. It should be noted that the drive motor operates to rotate the spindle in a direction so as to cause the unwinding of the tape on the supply reel and thus operates in conjunction with the cassette spool drive means to advance such tape. It is not intended that such drive motor be utilized to provide drag on the reel, since that is the function of the clutch-brake assembly.

The means for controlling the supply tape speed and tension comprises a vacuum plenum positioned along the supply tape path between the supply tape reel and the cassette loading station. The plenum is preferably in the form of an elongated vertically disposed rectangular chamber, the internal thickness of which corresponds to the width of the supply tape, so that such tape sealably engages the sides of the chamber to permit the creation of a pressure differential thereacross. The chamber has an open top and is adapted to receive therein a loop of supply tape in a manner which serves to minimize the drive friction of such tape, to control the tape speed and tension and to permit rapid acceleration of the tape. It should be noted that the chamber is designed such that the flat surface of the tape loop contacts the sides of the plenum only immediately adjacent the curved end portion of the loop to insure minimum friction. The plenum includes a vacuum port at its lower end connected to a suitable vacuum pump to evacuate the chamber, and a pressure or flow sensing port at a mid-point thereof connected to a suitable vacuum switch responsive to such flow or pressure. The switch is in turn operatively connected via a control circuit to the clutch-brake assembly, so that a relatively constant loop size tape tension and feed speed can be maintained.

The vacuum plenum is designed such that when the loop of tape drops below the sensing port the pressure or flow sensed by the switch is increased due to the open top of the chamber, indicating that the feed speed of the supply tape reel is too great. Similarly, if the loop is above the sensing port, the pressure or flow sensed by the switch is decreased, since the tape separates the open top of the chamber and the sensing port, indicating that the feed speed of the supply reel is insufficient. The vacuum switch controls the torque created by the clutch-brake assembly to thereby maintain the tape speed and permit the proper increase and/or decrease in the loop size. In this manner, the tension on the tape is maintained at a minimum and stretching is avoided since the cassette spool drive means cannot pull the tape taut.

It should be noted that upon loading the supply tape onto the winding apparatus and activating such apparatus, the drive motor for the spindle remains in continuous operation until the supply tape is depleted or the apparatus stopped. At the completion of each winding cycle the advancement of the supply tape is stopped by means of the clutch-brake assembly. When the cassette spool drive means is stopped at the end of the winding cycle, the supply reel continues to feed tape into the vacuum plenum, thus increasing the size of the loop therein. When such loop drops below the sensing port, the vacuum switch is opened to disengage the clutch and activate the brake, thus stopping the movement of the supply tape. When the next cassette is advanced to the loading position and the leader thereof is spliced to the leading end of the supply tape, the cassette spool drive motor is reactivated. reactivated, Such operation advances a portion of the supply tape sufficiently so that the loop within the vacuum plenum is reduced in size and raised above the vacuum sensing port. When this occurs, the vacuum switch is activated to engage the clutch and disengage the brake, thus recommencing the rotatable movement of the spindle and the supply tape reel mounted thereon. In this manner, it can be seen that the cassette spool drive means does not commence the rotation of the supply tape reel by pulling the tape, but on the contrary such rotation is recommenced by means of the drive motor and the clutch-brake assembly, thus serving to eliminate tape stretching upon start-up and to reduce the intertial drag created by the supply tape reel.

The variable speed control means for the drive motor operates simultaneously with the control means for the tape speed and tension by increasing the rotational speed of the spindle as the amount of supply tape on the reel diminishes, so as to maintain a relatively constant linear supply tape speed. Such speed control means comprises a plurality of tape sensing means positioned adjacent to and extending radially with respect to the supply tape reel. Each of said sensing means is responsive to a predetermined quantity of supply tape on the reel and is activated upon the reduction of such tape quantity to increase the speed of the drive motor. In the preferred embodiment, the tape sensing means comprises a series of photo-electric cells positioned on one side of the reel and a corresponding series of light sources for each of said cells on the other side of the reel. The depletion of the tape sequentially permits the light from each source to contact each photo-electric cell. Such cells are arranged in series and serve as a voltage divider which controls the power fed to the drive motor to thereby control the speed. An additional photo-electric cell and light source can also be provided to deactivate the winding apparatus when the full amount of tape on the supply reel has been depleted or when there is insufficient tape on the reel to fill the next cassette.

The foregoing features and components of the cassette loading apparatus of the invention along with additional features thereof are more fully defined in the accompanying drawings.

DESCRIPTION OF THE PREFERRED EMBODIMENTS

Figures 1, 2:
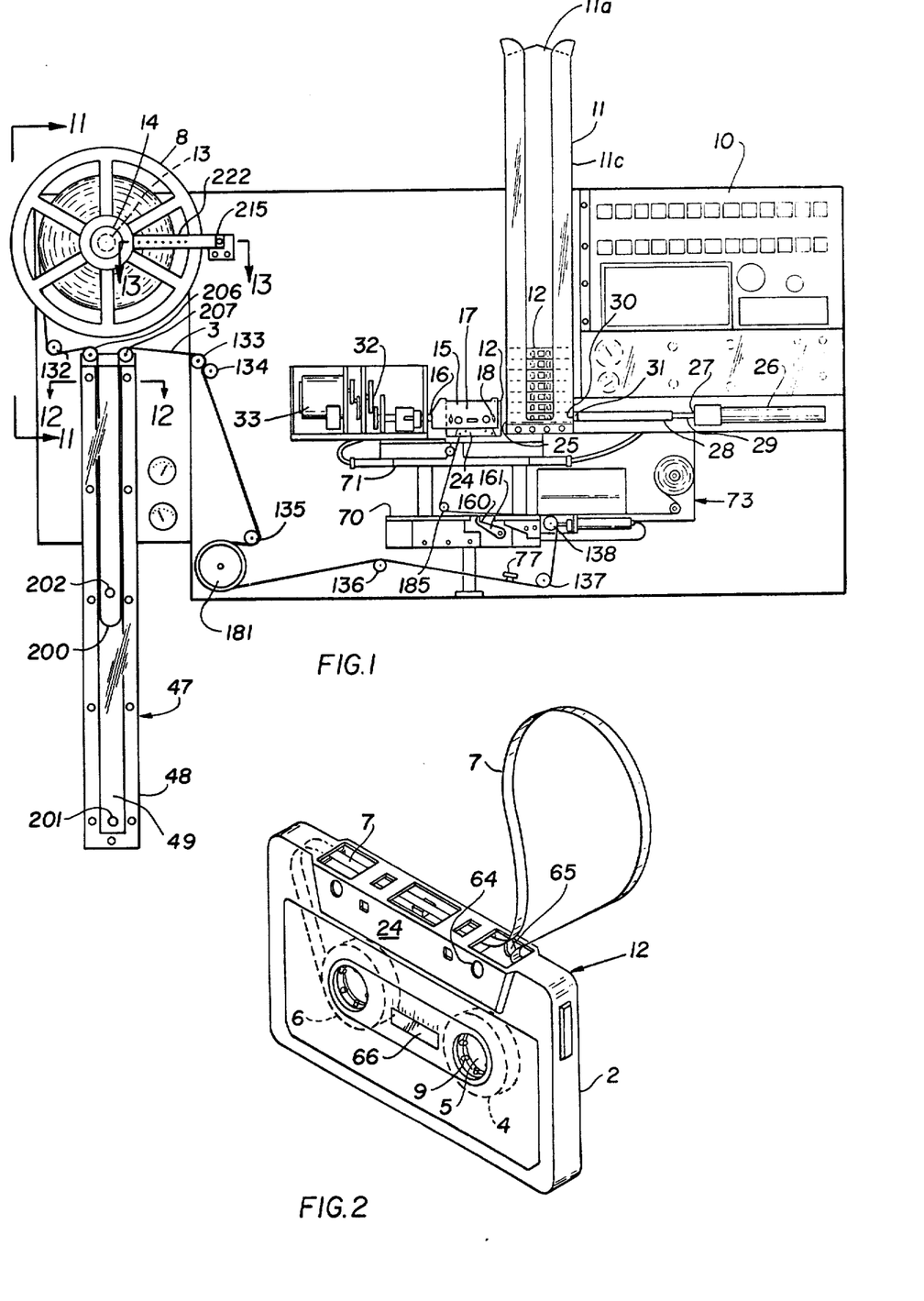
FIG. 1 is a front elevational view of the cassette winding apparatus of the invention, including the improved tape speed and tension control means.
FIG. 2 is a perspective view of a typical magnetic tape cassette used in the present invention.
Figure 3:
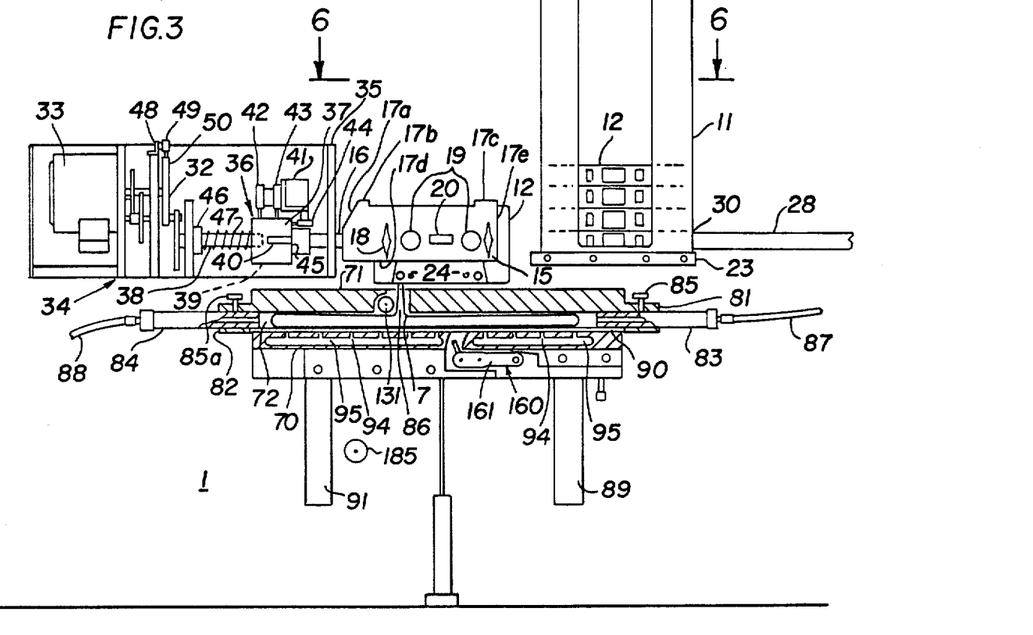
FIG. 3 is an enlargement of one portion of the winding apparatus of FIG. 1 shown partially in cross section.
Figure 7:
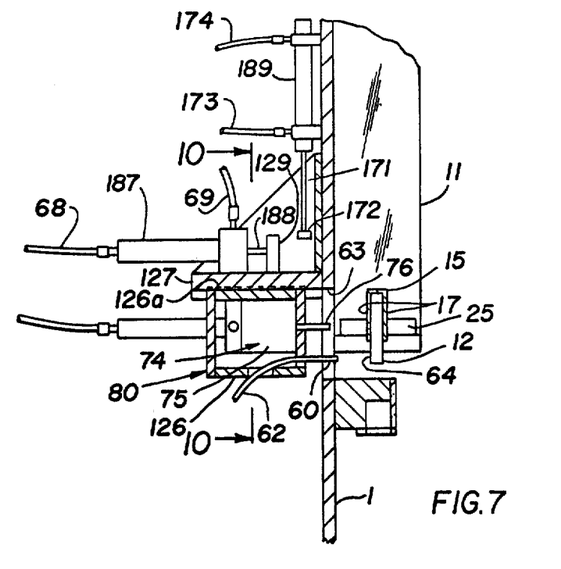
FIG. 7 is a cross-sectional view taken along the line 7—7 of FIG. 6.

As shown in FIGS. 1, 3 and 7, the apparatus for automatically loading a plurality of cassettes in accordance with the invention comprises a console having a mounting panel 1 which supports thereon a control panel 10; a spindle 13 for rotatably supporting a reel 8 of magnetic tape 3; a rectangular cross-section magazine 11 for holding a plurality of empty cassettes 12 to be loaded with a predetermined amount of magnetic tape; cassette receiving means 15 disposed adjacent one side of the magazine to receive one cassette at a time from the magazine and hold the same in a tape loading position; and cassette feed means 26 disposed on the opposite side of the magazine 11 for transporting each cassette from the magazine to the receiving means 15. A splicing block 70 disposed below the cassette receiving means is provided for supporting a section of magnetic tape 3 and leader tape 7 (FIG. 4) thereon; and means for positioning the leader tape 7 on the splicing block 70, comprisng an elongated leader guide housing 71 is mounted above the splicing block, cutting means 160 having a pivotally movable lever 161 is mounted on splicing block 70 to selectively sever the leader tape and the supply tape positioned on the splicing block. A splicing assembly 73 is movably disposed adjacent the splicing block to splice the severed leader 7 to the magnetic tape 3. The apparatus also comprises cassette drive means 74 (FIG. 7) comprising an electric motor 75 and a rotatable stub axle 76 to rotate a take-up spool 4 of cassette 12 to wind magnetic tape 3 thereon; and a transducer 77 to pick up an inaudible signal recorded on tape 3 to sense the amount of tape being wound into the cassette, and to deactivate drive motor 75 in response thereto.

Referring to FIG. 2, the cassettes 12 are of a conventional type comprising a case 2, two spools 4 and 6 rotatably mounted within the case, and a leader tape 7 having the opposite ends thereof secured to spools 4 and 6. The leader tape 7 is of sufficient length so that it may be withdrawn via opening 65 formed along one edge of case 2 for splicing to the leading end of the magnetic tape 3 to be loaded into the cassette as hereinafter described. Spool 4 has an aperture 5 to accommodate the rotatable stub axle 76 of the drive means 74 and internal teeth 9 which are operatively engaged by said stub axle to effectuate rotational movement of said spool to wind tape 3 thereon. The cassette also has a locating aperture 64 formed adjacent opening 65 on the front and rear faces of case 2, a raised portion 24 formed on both faces adjacent the edge containing opening 65, and a window 66 to visually observe the tape therein.

Figure 11:
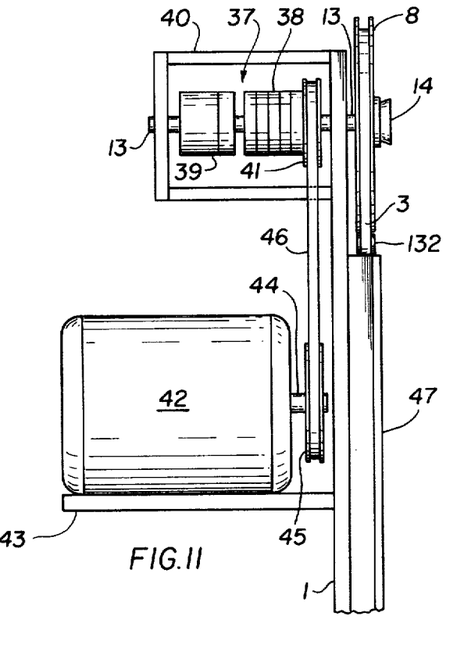
FIG. 11 is a partial side view showing the tape tension and speed control means taken along the line 11—11 of FIG. 1.

The supply reel 8 containing magnetic tape 3 is removably mounted on spindle 13 for rotational movement therewith by means of a hub 14 threadably attached to the end of spindle 13. As shown in FIG. 11 spindle 13 extends through plate 1 and is operatively connected to a pneumatic clutch-brake assembly 37 having a clutch section 38 and a brake section 39 integrally connected by means of spindle 13, which serves as a common shaft. The entire clutch-brake assembly is fixedly mounted on the rear of plate 1 by a box-like bracket 40, through which the end of spindle 13 is journaled. The clutch section 38 of the clutch-brake assembly includes a pulley 14 fixedly attached thereto. A variable speed constant torque electric drive motor 42 is fixedly mounted on a bracket 43, and includes a drive shaft 44 and a drive pulley 45 mounted on the end of shaft 44. A drive belt 46 operatively connects the two pulleys 41 and 45 to transmit rotational movement from motor 42 to clutch section 38.

At this juncture it should be noted that the clutch section 38 of the clutch-brake assembly is operative upon the application of air pressure thereto to positively engage spindle 13 extending therethrough, so that such spindle and reel 8 attached thereto will be rotatably driven by motor 42. Brake section 39, on the other hand, is operative upon the application of air pressure thereto to slow or stop the rotation of spindle 13, and in this regard it should be noted that the brake section is operative only when the clutch section has disengaged the spindle. This insures that the brake section will at no time be operated in opposition to the motor, and thereby prevents overheating of the motor and/or slippage of drive belt 46.

Figure 12:
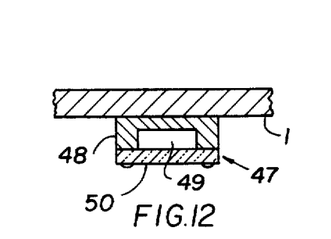
FIG. 12 is a partial cross-sectional view taken along the line 12—12 of FIG. 1 and showing the vacuum plenum.

Referring once again to FIG. 1, and to FIG. 12, it can be seen that a vacuum plenum 47 is mounted on the front plate 1 in the path of travel of magnetic tape 3 for controlling the tape tension and speed. The plenum 47 comprises a vertically disposed rectangular plate 48 having an elongated channel-like chamber 49 formed therein, the depth of which corresponds to the width of tape 3. A transparent face-plate 50 best seen in FIG. 12 sealably encloses the front of chamber 49, so that the edges of the tape can sealably engage the bottom of the channel-like chamber and the internal surface of the face-plate to permit the creation of a pressure differential across such tape. As shown in FIG. 1, vacuum plenum 47 is adapted to receive therein a loop 200 of tape 3 in a manner which serves to minimize the drive friction of such tape and by means of the operation of the vacuum plenum, as hereinafter described, to control tape speed and tension and permit rapid accelleration of reel 8. It should be noted that chamber 49 has parallel vertical sides so that only the lower portion of tape loop 200 immediately adjacent the curved end portion thereof, contacts such vertical sides, and in this manner insures minimum drive friction between the tape and the vacuum plenum.

Plenum 47 includes an evacuation port 201 disposed at the bottom of the chamber 49. Port 201 is in communication with a suitable vacuum pump (not shown) which is adapted to reduce the internal pressure within each chamber 49 to a point below atmospheric. In addition, a vacuum sensing port 202 is disposed within the plenum 47 in communication with chamber 49 at a midpoint thereof. Sensing port 202 is connected to a vacuum switch 203 (shown in FIG. 14) responsive to the pressure within chamber 49. The switch 203 is operatively connected via solenoid 204 to the clutch section 38 of the clutch-brake assembly and via solenoid 205 to the brake section to control the speed of spindle 13 and reel 8, and thereby maintain a relatively constant loop size. It can be seen that when the loop 200 of tape is below vacuum sensing port 202, the pressure sensed by the switch 203 connected to such port is increased, since the top of the plenum is open to atmosphere, indicating that the feed speed of reel 8 is excessive. When this occurs, the vacuum switch is operative to energize solenoid 204 to disengage the clutch section from spindle 13 and to simultaneously energize solenoid 205 to actuate the brake section to slow the rotational speed of spindle 13. Since the rotational speed of the cassette spool drive means 14 remains constant, the slowing of spindle 13 results in the reduction in the size of loop 200. Similarly, if loop 200 is above port 202, the pressure sensed by the vacuum switch is decreased, since the tape separates the port from the open top of the plenum, indicating that the feed speed of reel 8 is insufficient. In this instance, the vacuum switch is operative via solenoids 205 and 204, respectively, to disengage the brake section and engage the clutch section, thus increasing the speed of spindle 13 and increasing the size of loop 200.

Figure 14:
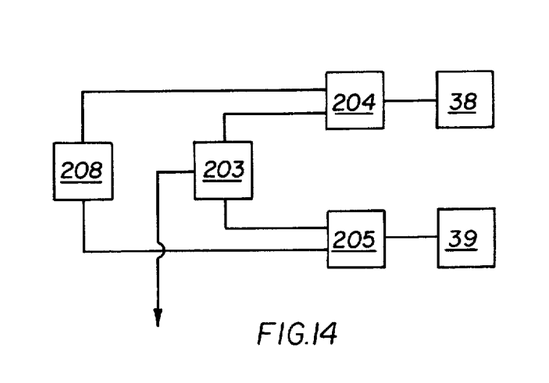
FIG. 14 is a schematic drawing of the tape tension and speed control means.

As shown in FIG. 14, a load switch 208 connected to solenoids 204 and 205 is also provided. The purpose of this switch is to permit the manual disengagement by means of the solenoids of both the clutch section and the brake section during the supply tape loading operation. This allows free wheeling of spindle 13, so that tape 3 may be threaded through the winding apparatus manually.

It is generally preferable that the feed speed of reel 8 as rotatably driven by motor 42 be greater than the take-up speed of the cassette spool being loaded as rotatably driven by drive means 74. This insures that the supply tape will not be stretched during the winding operation. Of course, feeding an excess quantity of tape cannot occur due to the operation of the vacuum plenum and the clutch-brake assembly. However, if the rotational speed of spindle 13 remains constant, the linear speed of the tape 3 will be reduced as the amount of such tape on reel 8 diminishes. Under such circumstances it is possible that the spool take-up speed could at some time exceed the reel feed speed, thus resulting in an undesirable situation.

Figure 13:
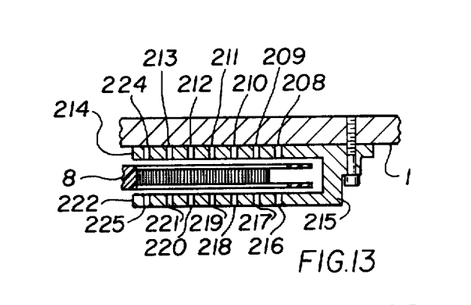
FIG. 13 is a partial cross-sectional view of the variable speed control means taken along the line 13—13 of FIG. 1.
Figure 16:
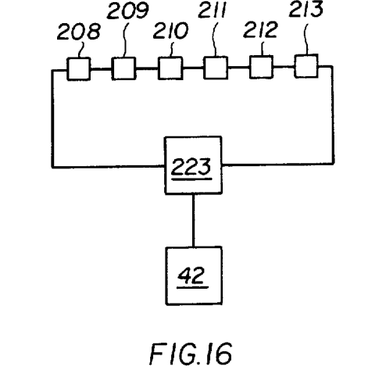
FIG. 16 is a schematic drawing of the variable speed control means.

To overcome this potential problem the variable speed control means mentioned hereinabove is provided and can be seen in FIGS. 1, 13 and 16. Such means comprises a series of six photo-electric cells 208 through 213 fixedly mounted on the inner leg 214 of a fork-like bracket 215. Bracket 215 is mounted horizontally on plate 1 adjacent to one portion of supply reel 8 and is positioned such that the photocells extend radially with respect to the reel. A corresponding series of six light sources 216 to 221 are mounted on the outer leg 222 of bracket 215 in alignment with photo cells 208 to 213, respectively, and are adapted to illuminate and energize such photocells as the tape on reel 8 is depleted.

The photocells form a voltage divider and are connected in series with the control circuit 223 of variable speed drive motor 42. When reel 8 is fully wound with tape, such tape prevents all of the photocells being illuminated by the light sources. In such condition, the control circuit 223 provides power to motor 42, so that motor 42 operates at a relatively slow speed. However, as the tape on reel 8 is depleted, the photocells are sequentially illuminated. When this occurs the power supplied to motor 42 is increased and its operating speed is likewise increased. The photocells and the control circuit 223 are arranged such that the speed of motor 42 increases as the tape is depleted from the reel by an amount sufficient to maintain the linear feed speed of the supply tape at a relatively constant rate, thus assuring that such tape will always be advanced from reel 8 at a rate greater than the take-up speed of the cassette spool, subject, of course, to the operation of the clutch-brake assembly.

Figure 8:
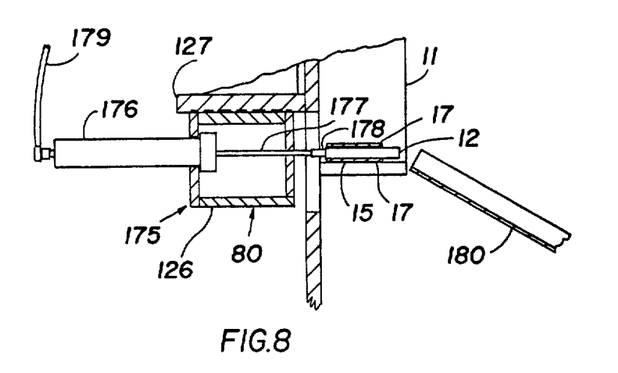
FIG. 8 is a cross-sectional view of one portion of the apparatus shown in FIG. 7.

The cassette receiving means 15 (hereinafter referred to as "receiver") is fixably mounted on the end of a rotatable shaft 16 which, as more fully described hereinafter, rotates the receiver between a vertical tape loading position as shown in FIG. 1 in which the opening 65 of a cassette held therein is downwardly disposed, and a horizontal cassette receiving and ejecting position as shown in FIG. 8. The cassette receiver comprises a pair of spaced apart parallel plates 17 rigidly secured to each other along edges 17a, 17b and 17c and defining therebetween a generally rectangular shaped sleeve open along edges 17d and 17e to receive and hold each cassette 12 as it is fed from magazine 11. A pair of spring clips 18 are mounted on the exterior of receiver 15 and have tab portions (not shown) which extend through suitable openings in plates 17 to engage case 2 of each cassette and thereby hold the same in a fixed position during the tape splicing and loading operations. Circular openings 19 are formed in both plates 17 of the receiver 15 in alignment with the apertures 5 of each spool of a cassette disposed therein to permit engagement thereof by the stub axle 76 of drive means 74. Also formed in the cassette receiver 15 is a window 20, which corresponds to window 66 of the cassette to permit the operator to visually observer the winding operation within the cassette.

Figure 6:
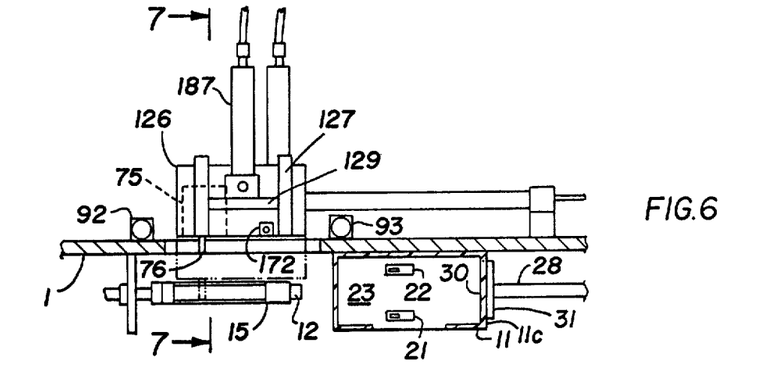
FIG. 6 is a partial cross-sectional view taken along the line 6—6 of FIG. 3.

The cassettes 12 are transported by feed means 26 from magazine 11 to receiver 15 via a discharge opening 25 formed in the lowermost portion of side wall 11b of magazine 11 located immediately above a bottom plate 23 and adjacent to the receiver 15. The feed means 26 comprises a solenoid operated pneumatic cylinder 27 fixably mounted on plate 1 in horizontal alignment with the lowermost cassette 12 in magazine 11. The cylinder 26 has a reciprocally movable piston 29, which fixedly carries a pusher rod 28 and a pusher tip 31 adapted to engage the trailing edge of the lowermost cassette in the magazine. An opening 30 formed in side wall 11c of magazine 11 permits entry of pusher rod 28 and pusher tip 31 upon actuation of cylinder 26. As shown in FIG. 6, pusher tip 31 extends parallel to the trailing edge of each cassette and engages each cassette over a relatively large area to provide a uniform feeding force to insure proper insertion of the cassette into receiver 15. The thickness of pusher tip 31 and of rod 28 is preferrably less than the thickness of each cassette 12, so that the feed means may be reciprocated without the danger of the pusher rod or the pusher tip catching on the next cassette above the cassette being inserted into the receiver.

As mentioned above, receiver 15 is shown in FIG. 1 in the loading position, in which position the leader 7 may be extracted and the supply tape inserted into a cassette 12. In the loading position the receiver is 90° out of phase with the orientation of the cassettes stored within magazine 11. Accordingly, in order to feed the lowermost cassette from the magazine to the receiver, the receiver must first be rotated 90 degrees into a cassette receiving position. The shape of the receiver 15 is such that cassettes can only be inserted therein with their raised portion 24 extending to the exterior of parallel plates 17. Accordingly, the direction in which receiver 15 must be rotated to accommodate the next cassette from magazine 11 depends upon the position of that cassette within the magazine, and this is accomplished by means of a Genava drive mechanism 32, which operatively engages shaft 16, and is powered by a bi-directional electric motor 33. A bracket assembly 34 rigidly secures the Geneva mechanism and the drive motor to mounting plate 1. Shaft 16 is journaled within an opening formed in a further mounting bracket 35 and is connected via a rotatable position detecting index mechanism 36 to the Geneva drive 32. Indexing mechanism 36 operates to activate the Geneva drive motor 33 for rotation in the proper direction to place receiver 15 into a position to accept the next cassette from the magazine. The Geneva mechanism 32 is adapted to rotate the receiver 15 in increments of 90 degrees each. The design of a Geneva drive mechanism is such that it accurately positions and holds an object being rotated, and as such is well suited for positioning the receiver 15 in the present invention.

As shown in FIG. 7, the means provided for withdrawing the tape leader from each cassette comprises a hollow tubular member 60, which is mounted on a transport means 80 for reciprocal horizontal movement at the rear of mounting plate 1 between a leader tape withdrawing position in which the tubular member 60 which is in alignment with alignment opening 64 of cassette 12 and a non-operative position out of such engagement. The structure and operation of transport means 80 is described hereinafter with reference to the spool drive means 74. An air nozzle 61 is downwardly disposed at one end of tubular member 60, so that an air jet discharged therefrom will contact the inner surface of the tape leader to apply a force thereagainst and thereby effectuate its extraction via opening 65 of cassette 12. A pneumatic pressure line 62 is connected to the other end of the tubular member 60 to provide the necessary air pressure. A rectangular shaped opening 63 is formed in plate 1 adjacent receiver 15 to permit passage of the tubular member 60 therethrough. Applying air pressure to tube 60 by means of line 62, after the insertion of the tube into opening 64 of the cassette, the air stream or jet discharged via nozzle 61 causes the tape leader contained within the cassette to be blown outwardly of the cassette in the form of a loop, a portion of which is positioned upon splicing block 70.

Referring once again to FIG. 3, it can be seen that the elongated leader guide housing 71 of the leader tape positioning means has an internal chamber or plenum 72 formed therein. The plenum has a substantially rectangular cross-sectional shape, the width of which is slightly wider than the leader tape to provide guidance therefor, and is fully open along the bottom side. Vacuum ports 81 and 82 are disposed at opposite ends of the housing 71 in communication with plenum 72. A leader entrance passage 86 is formed at a midpoint of housing 71 adjacent opening 65 of a cassette 12 held in the loading position to permit the entry into plenum 72 of a loop of leader tape 7 upon its extraction from a cassette. A pivotally rectractable guide roller 131 is disposed in passage 86 and is adapted to be automatically moved into an operative tape guiding position during the winding of the supply tape 3 into a cassette. Lines 87 and 88 connect ports 81 and 82, respectively, to a vacuum source which evacuates plenum 72 during the leader tape positioning operation to draw the leader loop into a shape which substantially conforms to the internal shape of the plenum. It has been found that the best results are achieved by alternately applying suction to the ports 81 and 82, simultaneously with the discharge of an air jet from nozzle 61.

Figure 4:
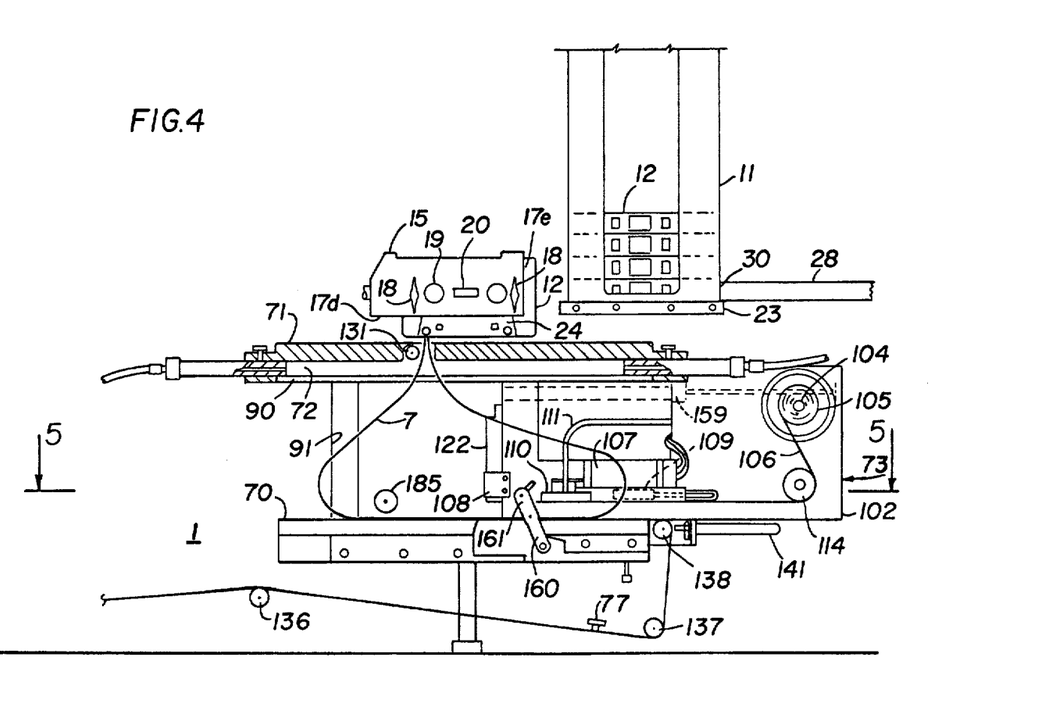
FIG. 4 is an other view of a portion of the machine shown in FIG. 1.
Figure 5:
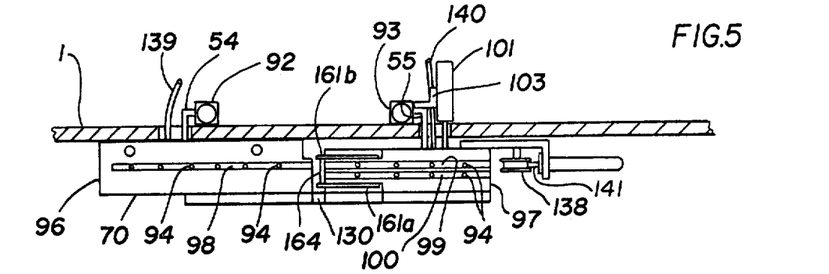
FIG. 5 is a partial cross-sectional view taken along the line 5—5 of FIG. 4 showing the splicing block utilized in the instant invention.

The bottom of plenum 72 is enclosed during the leader tape positioning operation by splicing block 70, which is vertically movable between a leader tape receiving position enclosing the plenum as shown in FIG. 3, and a tape cutting, splicing and winding position spaced from the plenum as shown in FIGS. 1 and 4. The splicing block 70 has a pair of support brackets 54 and 55 which extend through and ride within slotted openings 89 and 91 formed in mounting plate 1. Solenoid operated pneumatic cylinders 92 and 93 are fixedly disposed on the rear of mounting plate 1 as shown in FIGs. 5 and 6 and have their actuating arms attached to support brackets 54 and 55, respectively, to raise and lower the splicing block between the two aforesaid positions. A gasket 90 is attached to housing 71 along the periphery of the open bottom of vacuum plenum 72, so that in the leader tape receiving position, splicing block 70 engages gasket 90 to sealably enclose vacuum plenum 72.

It can be seen in FIG. 5 that splicing block 70 comprises two contiguous splicing block sections 96 and 97, which define a continuous flat splicing surface having a gap 130 therebetween. An elongated tape guide groove 98 formed in splicing block section 96 extends longitudinally therealong and is adapted to receive and hold therein the leader tape during the initial cutting and splicing of the leader to the leading end of the supply tape 3, and the trailing end of the supply tape during the final cutting and splicing operation. Similarly, splicing block section 97 has formed in the surface thereof a pair of tape guide grooves 99 and 100 which are also adapted to receive and hold the leader tape and the supply tape, respectively. It should be noted that the width of each of the guide grooves corresponds to the width of the tape to insure its proper alignment during the cutting and splicing operations. A plurality of apertures 94 are formed in the bottom surfaces of each guide groove and are connected to a central chamber 95 in each splicing block section. The chambers 95 are connected via lines 139 and 140 shown in FIG. 5 to a vacuum source, which is activated to position and firmly hold the leader tape 7 and the supply tape 3 within the guide grooves by means of suction.

Splicing block section 97 is movable transversely of section 96 to selectively align guide grooves 99 and 100 with guide groove 98 to define two distinct cutting and splicing positions of the splicing block. A solenoid pneumatic cylinder 101 attached to bracket 55 by means of angle bracket 103 provides the motive force to shift splicing block section 97 between the two positions.

The first splicing block position is shown in FIG. 5 and is defined by the alignment of grooves 98 and 99. The movable splicing block section is held in this position during the withdrawal and positioning of the leader tape thereon so that grooves 98 and 99 are aligned with vacuum plenum 72 in the vertically raised leader tape receiving position of the splicing block. In addition, the first splicing block position is maintained during the initial cutting of the leader. The second splicing block position is defined by the alignment of grooves 98 and 100, and is utilized to initially splice the cut leader held in groove 98 to the leading end of the supply tape held in groove 100.

This position is also maintained to cut the supply tape after a predetermined amount has been wound into the cassette. Thereafter the splicing block is returned to its first position to splice the trailing end of the supply tape held in groove 98 to the remaining leader section held in groove 99.

Prior to initially starting the apparatus of the invention, the supply tape 3 stored on reel 8 is manually threaded under roller 132, a loop 200 thereof is placed in vacuum plenum 47, the ends of which extend over and are guided by rollers 206 and 207 disposed adjacent the top opening of the plenum, and the tape is then extended over and under a series of guide rollers 133 to 138 shown in FIG. 1, so that the leading end thereof may be placed within guide groove 100 of splicing block section 97. Suction via line 140 is then applied to hold the tape within the guide grooves during the withdrawal and cutting of the leader tape from the first cassette to be loaded and the splicing thereof to the supply tape. To further secure the supply tape in the proper position upon splicing block section 97 during cutting and splicing, and during the feeding and ejecting of the first and subsequent cassettes to and from receiver 15, a pneumatically operated clamp 141 is mounted on splicing block section 97 adjacent guide roller 138.

Figures 9, 15:
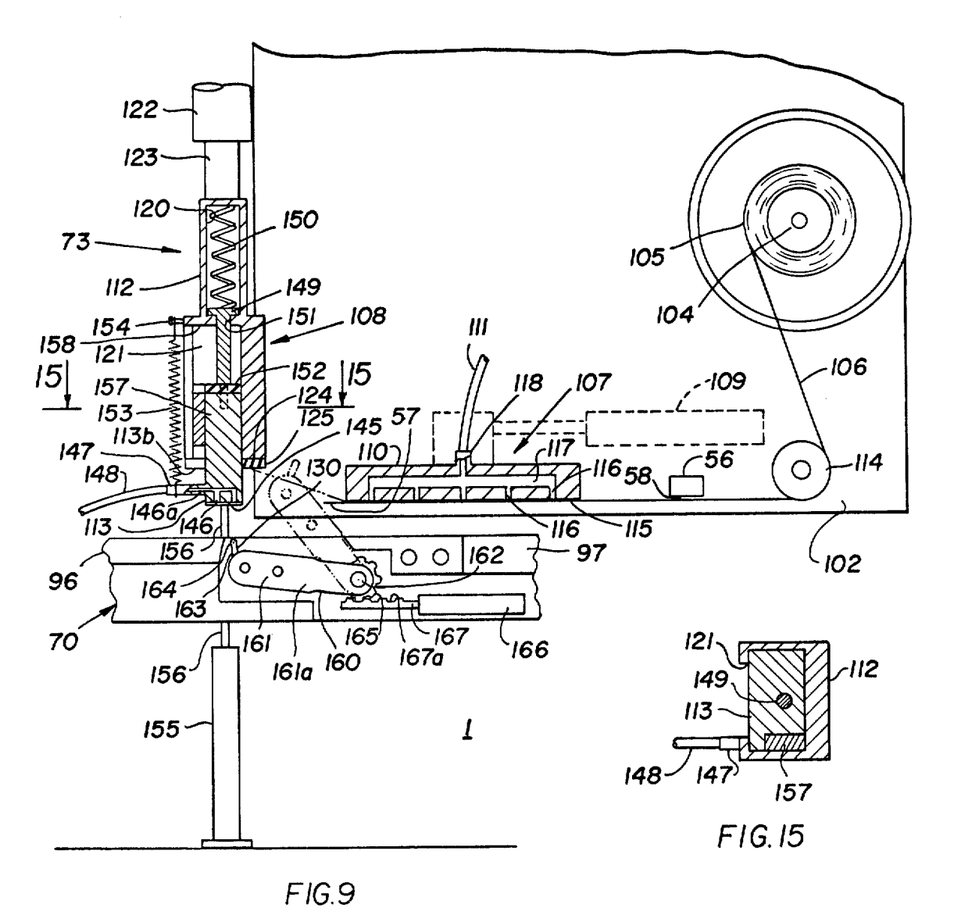
FIG. 9 is a partial cross-sectional view of a portion of the tape splicing assembly and cutting means of the winding apparatus.
FIG. 15 is a cross-sectional view of the splicing head taken along the line 15—15 of FIG. 9.

Referring to FIGS. 1, 4 and 9 it can be seen that splicing assembly 73 is mounted between housing 71 and the cutting and splicing position of splicing block 70 for horizontal reciprocal movement upon mounting plate 1. In this manner the splicing assembly 73 can be moved into a non-operative position to avoid interference with splicing block 70 when the splicing block is vertically raised into its leader tape receiving position. The nonoperative position of the splicing assembly is shown for illustrious purposes in FIG. 1, but it should be noted that in actual operation when the other components and sub-assemblies of the winding apparatus are in the position shown in FIG. 1, which occurs during the winding of the supply tape 3 into a cassette, the splicing assembly 73 will be in the operative position shown in FIG. 4.

Splicing assembly 73 comprises a transport plate 102 supported on mounting plate 1 and automatically movable between the operative and non-operative positions described above by means of solenoid operated pneumatic cylinder 159 mounted at the rear of plate 1 and attached to plate 102 by means of brackets (not shown), which extend through suitable openings formed in plate 1. Mounted on plate 102 are a spindle 104 to removably support a roll 105 of adhesive splicing tape 106; a guide roller 114 for tape 106; a splicing tape feed mechanism 107 to advance the splicing tape 106 from roll 105 to the splicing position; and a splicing head assembly 108, which receives the splicing tape from the feed mechanism and applies the same under pressure to the tape to be spliced on splicing block 70. The splicing tape feed mechanism 107 includes a splicing tape holding block 110 and a pneumatic cylinder 109 adapted to reciprocally move block 110 with respect to plate 102 to effectuate splicing tape advancement. The holding block 110 is rectangular in shape and has an elongated guide groove 115 formed in the lower surface thereof for receiving and holding a section of splicing tape 106. A plurality of passages 116 are formed within the block 110 and connect the upper surface of groove 115 with a central bore or chamber 117. A hollow adapter 118 in communication with central bore 117 is connected to vacuum source via line 111. In this manner, splicing tape 106 can be held within groove 115 by suction during the feeding operation.

The splicing head assembly 108 comprises a pressure block 112 having a cylindrical chamber 120 formed in the upper section thereof, a rectangular shaped chamber 121 formed in the lower portion thereof, and a horizontal bottom surface 124, to which is attached a rubber pressure pad 125. A rectangular cross-section splicing head 113 is slidably disposed within chamber 121 of the pressure block 112, and is guided for vertical movement therein by the internal side of the chamber which are shown in FIG. 15. Splicing head 113 is formed with a slot 113a which serves as a guide passage for splicing tape applicator 157. Applicator 157 is slidably disposed within slot 113a for vertical reciprocal movement. A splicing tape pressure pad 145 is attached to the bottom surface of splicing applicator 157 and is adapted to receive the splicing tape from splicing block 110 and hold the same in the proper position for application to the abutting ends of the leader tape and the supply tape in splicing block 70. At least two passages 146 formed in the splicing applicator 157 terminate at the bottom surface of pad 145 and are connected via central passage 146a, adaptor 147 and line 148 to a vacuum source to provide suction to hold the splicing tape on the pads 145. A T-shaped pin 149 is disposed within chamber 120 of pressure block 112, extends downwardly via passage 151 into chamber 121 and is threadably attached to the top of head 113. A helical compression spring 150 disposed within chamber 120 urges the head portion of pin 149 toward the bottom of chamber 120. A helical tension spring 153 is connected at one end to the pressure block 112 above chamber 121 by means of screw 154, and is connected at the other end to the line adaptor 147 to urge connector 146a of splicing applicator 157 into a groove 113b formed at the bottom of splicing head 113.

A solenoid operated pneumatic cylinder 122 is fixedly mounted on plate 102, and has a piston arm 123 which is attached to the upper surface of pressure block 112 to reciprocally move the splicing head assembly 108 between a splicing tape pickup position, as shown in FIG. 9, and a splicing position in which the splicing tape held on pad 145 of splicing applicator 157 is placed in contact with the supply tape and leader tape positioned upon splicing block 70. Another pneumatic cylinder 155 is rigidly secured to plate 1, and has a piston rod 156, which extends upwardly behind splicing block 70 and is in operative engagement with the bottom surface of splicing head 113, at a point located behind splicing applicator 157. Actuation of cylinder 155 overcomes the downward biasing force of compression spring 150 and thereby lifts splicing foot 113 and applicator 157 within chamber 121 to a vertical point in which the bottom surface of pad 145 is in alignment with the bottom of pressure pad 125. The top surface of head of head 113 contacts surface 158 of chamber 121 to stop the upward movement of splicing head 113. A rubber pad 152 is attached to the top of applicator 157 to cushion the impact of the applicator upon its contact with the splicing block after actuation of cylinder 122.

The splicing head 113 and applicator 157 is held in the lifted position during the splicing tape cutting operation, which is described in more detail hereinafter. When cylinder 155 is deactivated, piston rod 156 is withdrawn, and spring 150 returns splicing head 113 and applicator 157 tape receiving position from which it is lowered by cylinder 122 onto splicing block 70.

The splicing assembly 73 is initially set up for operation by withdrawing a portion of splicing tape 106 from roll 105, threading the same around guide roller 114, and placing a section thereof within guide groove 115 of block 110 with the leading end 57 extending beyond the end of the block a sufficient distance, so that it may be picked up by pad 145 of splicing applicator 147 upon advancement of the transport means 107. Vacuum line 111 is then actuated to hold the splicing tape in place by suction. All subsequent operations of the splicing assembly, until the supply of splicing tape is exhausted, are fully automatic. At the appropriate instant, during each cutting, splicing and winding cycle of the instant apparatus, pneumatic cylinder 109 is actuated to advance holding block 110 from the position shown in FIG. 9 to a position whereby the leading end 57 of the splicing tape 106 extends beneath splicing applicator 157. At that point, vacuum line 148 is actuated to secure end 57 upon pad 145 and vacuum line 111 is deactivated so that holding block 110 releases its hold upon splicing tape 106. Cylinder 109 then retracts block 110 to the starting position and vacuum line 111 is again actuated to secure the next section of splicing tape in place within guide groove 115. A microswitch 56 is mounted on plate 102 in the splicing tape path between guide roller 114 and holding block 110. An actuating button 58 of the microswitch is held in a depressed position by the presence of splicing tape 106 and is released when the splicing tape is depleted, to provide a suitable signal indicating that the supply of splicing tape must be replenished.

Cutting means 160 comprises a lever 161 having two individuals lever sections 161a and 161b pivotally mounted by means of shaft 162 on opposite sides of splicing block section 97. The front of lever section 161a can be seen in FIG. 9, and top of both lever sections 161a and 161b can be seen in FIG. 5. The lever sections are fixedly mounted on the ends of shaft 162 by any suitable means for movement therewith, and the shaft is journaled within appropriate openings formed in splicing block section 97. Shaft 162 has a gear 165 rigidly attached thereto. Gear 165 is operatively engaged by piston 167 of hydraulic cylinder 166 which is formed with a corresponding rack 167a, so that upon actuation of the hydraulic cylinder the cutting means is pivotally moved from the position shown by the solid lines to the position shown by the dotted lines in FIG. 9. Hydraulic cylinder 166 and the corresponding linkage can be disposed either at the front or rear of splicing block 70 or within a hollow portion thereof.

A foot section 163 extends upwardly from the free ends of both lever sections 161a and 161b. A thin high impedance wire 164 formed of tungsten or a similar metallic material extends between the two lever sections at the upper end of the foot sections, and is adapted to pass through gap 130 between splicing block sections 96 and 97 to permit pivotal movement of lever 161 between the indicated positions. The wire 164 is connected to a suitable electric circuit which provides, upon actuation thereof, a high potential to heat the wire to a sufficient temperature to enable it to sever the supply tape or leader tape held on splicing block 70 and the splicing tape held within splicing assembly 73. Due to its inherent nature of uniformly heating, the hot wire 164 is adapted to sever the tape on the splicing block and the splicing tape during both its upward and downward movement. It can be seen that the splicing tape is cut in a manner such that the trailing end of the cut section extends beneath pad 125 and the leading end of the supply portion overhangs the end of holding block 110.

After the initial cutting operation during each loading cycle of the apparatus of the invention, that is where the leader tape held in the first position of the splicing block 70 is cut and a section of splicing tape is cut, lever arm 161 of the cutting means 160 is held in its uppermost position. At that point, the cylinder 155 is deactivated, permitting spring 150 to return splicing foot 113 to the splicing tape receiving position. Splicing cylinder 122 is then automatically actuated to lower the entire splicing head assembly 108 into a splicing position, wherein the section of splicing tape held within groove 145 of splicing foot 113 is applied under pressure to abutting sections of supply and leader tape held in the splicing block 70. Continued pressure applied to the splicing head assembly 108 by means of air cylinder 122 causes compression of spring 155 to the point where rubber pressure pad 125 contacts the overhanging portion of the cut splicing tape and applies the same under pressure to the tape on the splicing block. This assures that the entire section of splicing tape which is cut by the cutting means 160 is uniformly applied to abutting sections of supply tape and leader tape.

Upon completion of the foregoing splicing operation, cylinder 122 returns the splicing head assembly 108 to its tape receiving position, whereupon splicing tape feed means 107 is again actuated to transport the overhanging leading end 57 of the splicing tape held within block 110 to a position whereby it is picked up within groove 145 of splicing foot 113 and splicing foot 113 is raised by cylinder 155. All of this occurs within the lever 161 of the cutting means 160 held in its raised position. The holding block 110 is adapted to move between lever arm sections 161a and 161b and beneath hot wire 164 to transport the splicing tape to the splicing head assembly and return to its starting position. At that point, the cutting means actuating cylinder 166 returns the lever arm 161 to its starting position, to cut the next section of splicing tape and the tape held in the second position of splicing block 70.

Figure 10:
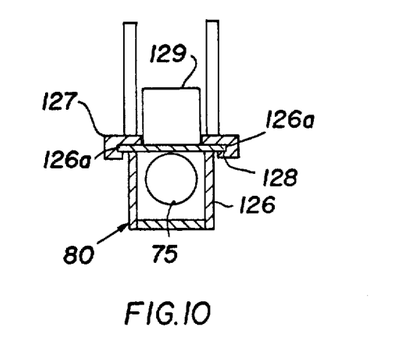
FIG. 10 is a cross-sectional view of the drive motor transport assembly taken along the line 10—10 of FIG. 7.

The cassette drive means 74 and the transport means 80 upon which the drive means is mounted are shown in FIGS. 6, 7 and 10. As mentioned hereinbefore, the drive means comprises and electric motor 75 having a stub axle 76 adapted to operatively engage take-up spool aperture 5 of a cassette held in the loading position. Motor 75 is preferably of the variable speed type to permit adjustments in the take-up speed of the tape during the winding operation. However, as noted hereinabove, the speed of such motor is always less than the speed of driver motor 42 for the supply reel 8.

As mentioned hereinbefore, tubular member 60 of the leader tape extraction means is also mounted on transport means 80. Accordingly, transport means 80 is selectively movable between a non-operative position as shown in FIG. 7; a leader tape extracting position, in which tubular member 60 engages aperture 64 of a cassette held in receiver 15, so that nozzle 61 is adjacent leader tape 7; and a drive position in which stub axle 76 operatively engages teeth 9 of spool 4 of the cassette. The transport means 80 comprises a housing 126 slidably mounted on the undersurface of an angle bracket 127, which is fixably attached to plate 1. Referring to FIG. 10 it can be seen that housing 126 is in the form of a rectangular box, the top portion of which has an outwardly extending flange 126a adapted to ride within a corresponding groove 128 formed in the bottom of angle bracket 127. An upstanding lug 129 extends from the top of housing 126 through an opening 186 formed adjacent groove 128 in the bottom portion of bracket 127. A transport cylinder 187 is fixedly mounted on bracket 127 and has a piston arm 188 attached to the upstanding lug 129. Air pressure lines 68 and 69 are connected by suitable fittings in opposite ends of cylinder 187 to provide the necessary pressure to actuate piston arm 188, so as to reciprocally transport housing 126 between the three positions described above via opening 63 formed in plate 1. Cylinder 187 has no intermediate position corresponding to the leader tape extracting position. Therefore, to stop the housing 126 in the leader tape extracting position, a transport limit cylinder 189 mounted on plate 1 is provided. Cylinder 189 is connected to air pressure lines 173 and 174 and has a piston arm 171 and a stop lug 172 formed on the end thereof. Upon actuation of cylinder 189, piston arm 171 is extended to position stop lug 172 between upstanding lug 129 of the transport housing 128 and the vertical portion of bracket 127, thereby stopping the inward movement of the transport means, with tube 60 in the proper location for the extraction of the leader tape contained within a cassette. In operation, after the leader tape is extracted, cylinder 189 is actuated to raise piston arm 171 and stop lug 172 out of its obstructing position between lug 129 and the vertical portion of bracket 127, so as to permit cylinder 187 to move transport housing 126 into the spool drive position.

Cassette ejection means 175 for discharging fully loaded cassettes from the receiver 15 is also mounted on housing 126 of transport means 80. The ejection means comprises a pneumatic cylinder 176 having a reciprocally movable piston arm 177 and a pusher lug 178 mounted on the end thereof.

An air line 179 is connected to the end of cylinder 176 to provide the necessary pressure. The ejection means is operative in the fully withdrawn position of the transport means 80, when the cassette receiver 15 is disposed in a horizontal position as shown in FIG. 8. Upon actuation of cylinder 176, pusher lug 178 enters receiver 15 along an open edge thereof between plates 17 and engages the closed edge portion of cassette 12 to push the same out of the receiver. A chute 180 is provided to catch or direct the cassettes as they are ejected from the receiver. After ejection, piston arm 177 and pusher lug 178 are retracted into the confines of housing 126, so that they do not interfere with the other operations of the cassette winding apparatus of the invention.

Referring once again to FIG. 1, several additional components in the apparatus of the invention are shown. An electronic counter, such as a Durant Series 2000 counter, having a transducer wheel 181, one foot in circumference, is mounted on plate 1 in the path of supply tape 3. The counter operates individually in case of blank tape and in conjunction with the transducers 77 and 78 in the case of prerecorded tape to provide a signal to stop the cassette drive motor 75 when a predetermined amount of tape has been loaded within cassette 12.

In addition, a further photocell 224 and a corresponding light source 225 are also provided on bracket 215 adjacent the hub of reel 8. Such photocell is operative to completely deactivate the entire winding apparatus when all or substantially all of the tape on reel 8 is depleted. This insures that a partial tape program will not be wound onto a cassette.

To institute the operation of the apparatus of the invention, the operator first places load switch 208 in the load position to deactivate the clutch-brake assembly and then loads the machine with a suitable reel of prerecorded or blank tape 3, a plurality of cassettes 12, and a reel of splicing tape 106. The supply tape is threaded around the guide rollers shown in FIG. 1, a loop thereof is placed within the vacuum plenum, and the leading end is placed within groove 100 of splicing block section 97. Similarly, splicing tape 106 is threaded around guide roller 114 of the splicing assembly 73 and placed within groove 115 of holding block 110 with its leading end overhanging the edge of the block. The apparatus is then actuated by the operator so that each cassette is sequentially loaded with the appropriate amount of supply tape, and ejected from the apparatus upon completion of the loading apparatus, all automatically.

It will be understood by those skilled in the art that the embodiments described hereinabove are included for illustrative purposes only and in no way limit the invention. As will be apparent there are numerous modifications that can be made to the various mechanical and electrical components which comprise the winding apparatus of the invention, all of which fall within the scope of the invention. For example, the apparatus of the invention can be readily adapted for use with tape on film of any type, such as video tape and photographic film. In addition, with slight modification the instant apparatus can be adapted to load single reel tape or film cassettes or cartridges, including, but not limited to, those of the endless loop type.

What is claimed is:

1. In an apparatus for automatically loading a plurality of cassettes of the type having at least one rotatable spool and a leader attached to said spool with a predetermined length of tape or the like including: a loading station; means for storing a plurality of cassettes to be loaded; means for advancing said cassettes, one at a time, from said storing means to said loading station; means for extracting the leader from each cassette in the loading station; means for feeding supply tape to be loaded from a rotatable reel thereof; splicing means for joining the leading end of said tape to the trailing end of said leader; rotatable drive means for rotating the spool of each cassette to wind a predetermined length of said tape therein; and cutting means to sever the tape upon completion of the winding operation, the improvement comprising a drive motor for imparting rotational movement of the reel of supply tape; a clutch-brake assembly operatively linking the drive motor and the reel to activate said reel and control the drag thereon; and means connected to the clutch-brake assembly for controlling the speed of the supply tape; said means including vacuum means for receiving a loop of supply tape and responsive to the size of said loop to correspondingly control the operation of the clutch-brake assembly to maintain a relatively constant loop size.

2. The improvement in accordance with claim 1, in which the vacuum means comprises an elongated vacuum plenum positioned along the supply tape path between the supply tape reel and the loading station and having a closed end including a vacuum port; an open end adapted to receive therein the loop of supply tape; a pressure port in communication with a midpoint thereof; means connected to the vacuum port to reduce the pressure within the plenum; and pressure sensitive means connecting the pressure port and the clutch-brake assembly, responsive to the pressure within the plenum, which varies in accordance with the position of the supply tape loop with respect to the pressure port, to emit signals to control the clutch-brake assembly to increase or decrease the supply tape loop size.

3. The improvement in accordance with claim 2, in which the clutch-brake assembly is operative to engage and disengage the drive motor from the supply tape reel, and to slow, stop and start the rotation of said reel, in response to the signals emitted by the pressure sensitive means.

4. The improvement in accordance with claim 3, in which the clutch-brake assembly is of the pneumatic type, whereby the amount of air pressure fed thereto controls the drag on the supply tape reel.

5. The improvement in accordance with claim 1, in which the drive motor has a constant torque and variable speed output to permit rapid acceleration of the supply reel with little inertial drag.

6. The improvement in accordance with claim 5, further comprising variable speed control means positioned adjacent the reel of supply tape and responsive to the amount of tape on said reel; said speed control means being operatively connected to the drive motor and adapted to increase the rotational speed thereof as the amount of supply tape on the reel diminishes so as to maintain a relatively constant linear supply tape speed.

7. The improvement in accordance with claim 6, in which the variable speed control means comprises a plurality of tape sensing means extending radially with respect to the supply tape reel, each of said sensing means being responsive to a predetermined quantity of supply tape on the reel.

8. The improvement in accordance with claim 7, in which each tape sensing means comprises a photo-electric cell positioned on one side of the reel and a corresponding light source on the other side of the reel, whereby the depletion of the tape permits the light from the source to contact the photo-electric cell.

9. In an apparatus for automatically loading a plurality of cassettes of the type having at least one rotatable spool and a leader attached to said spool with a predetermined length of tape or the like including a loading station; means for storing a plurality of cassettes to be loaded; means for advancing said cassettes, one at a time, from said storing means to said loading station, means for extracting the leader from each cassette in the loading station; means for feeding a supply of tape to be loaded from a rotatable reel thereof; splicing means for joining the leading end of said tape to the trailing end of said leader; rotatable drive means for rotating the spool of each cassette to wind a predetermined length of said tape therein; and cutting means to sever the tape upon completion of the winding operation, the improvement comprising a variable speed drive motor for imparting rotational movement to the reel of supply tape; and variable speed control means connected to the drive motor and responsive to the amount of supply tape on said reel to increase the rotational speed of the motor and the reel as the amount of supply tape on the reel diminishes so as to maintain a relatively constant linear supply tape speed.

10. The improvement in accordance with claim 9, in which the variable speed control means comprises a plurality of tape sensing means positioned adjacent the reel of supply tape and extending radially with respect to said reel, each of said sensing means being responsive to a predetermined quantity of supply tape on the reel.

11. The improvement in accordance with claim 10, in which each tape sensing means comprises a photo-electric cell positioned on one side of the reel and a corresponding light source on the other side of the reel, whereby the depletion of the tape permits the light from the source to contact the photo-electric cell.

12. A feeding apparatus for advancing continuous lengths of tape from a supply source at a relatively constant linear speed comprising a motor driven spindle for receiving a reel of tape; a clutch-brake assembly adapted to engage and disengage the spindle from the drive motor and to control the drag of the spindle; and vacuum means connected to the clutch-brake assembly for further controlling the rotational speed of the spindle; said vacuum means being adapted to receive a loop of said tape and being responsive to the size of said loop to correspondingly control to operation of the clutch-brake assembly to maintain a relatively constant loop size.

13. A feeding apparatus in accordance with claim 12, further comprising a variable speed drive motor for imparting rotational movement to said spindle; and speed control means connected to the drive motor and responsive to the amount of tape on the reel to increase the rotational speed of the motor and the spindle as the amount of tape on the reel diminishes to maintain a relatively constant linear tape speed.

14. The improvement in accordance with claim 13, in which the variable speed control means comprises a plurality of tape sensing means positioned adjacent the reel of tape and extending radially with respect to said reel, each of said sensing means being responsive to a predetermined quantity of tape on the reel.

15. The improvement in accordance with claim 14, in which each tape sensing means comprises a photo-electric cell positioned on one side of the reel and a corresponding light source on the other side of the reel, whereby the depletion of the tape permits the light from the source to contact the photo-electric cell.

16. A feeding apparatus in accordance with claim 12, in which the vacuum means comprises an elongated vacuum plenum having a closed end including a vacuum port, an open end adapted to receive therein the loop of tape; a pressure port in communication with a midpoint thereof; means connected to the vacuum port to reduce the pressure within the plenum; and pressure sensitive means connecting the pressure port and the clutch-brake assembly, responsive to the pressure within the plenum, which varies in accordance with the position of the tape loop with respect to the pressure port, to emit signals to control the clutch-brake assembly to increase or decrease the tape loop size.

* * * * *